United States Patent [19]
Meadow

[11] 3,864,512
[45] Feb. 4, 1975

[54] COVER FOR UTILITY OUTLET
[76] Inventor: Theodore B. Meadow, 2610 Pine Valley Rd., Albany, Ga. 31707
[22] Filed: Feb. 13, 1974
[21] Appl. No.: 442,194

[52] U.S. Cl.................................. 174/66, 220/24.2
[51] Int. Cl............................................ H02g 3/14
[58] Field of Search ...... 174/66, 67; 220/24.2, 24.3; D26/13 B; D8/179, 181, 184

[56] References Cited
UNITED STATES PATENTS
| | | | |
|---|---|---|---|
| 3,597,526 | 8/1971 | Boatwright et al. | 174/66 |
| 3,729,572 | 4/1973 | Helin | 174/66 |
| 3,749,815 | 7/1973 | Boatwright et al. | 174/66 |

Primary Examiner—Joseph V. Truhe
Assistant Examiner—David A. Tone
Attorney, Agent, or Firm—Bacon & Thomas

[57] ABSTRACT

A cover for a utility outlet box is made up of two separate plate members having abutting edges and overlapping portions. Score lines provide for forming a hole of desired size at the juncture of the abutting edges and aligned holes are provided through the overlapping portions for securing the plate portions together and mounting them on an outlet box. The plates are so configured that there is an unobstructed region behind the hole delineated by the score lines.

5 Claims, 4 Drawing Figures

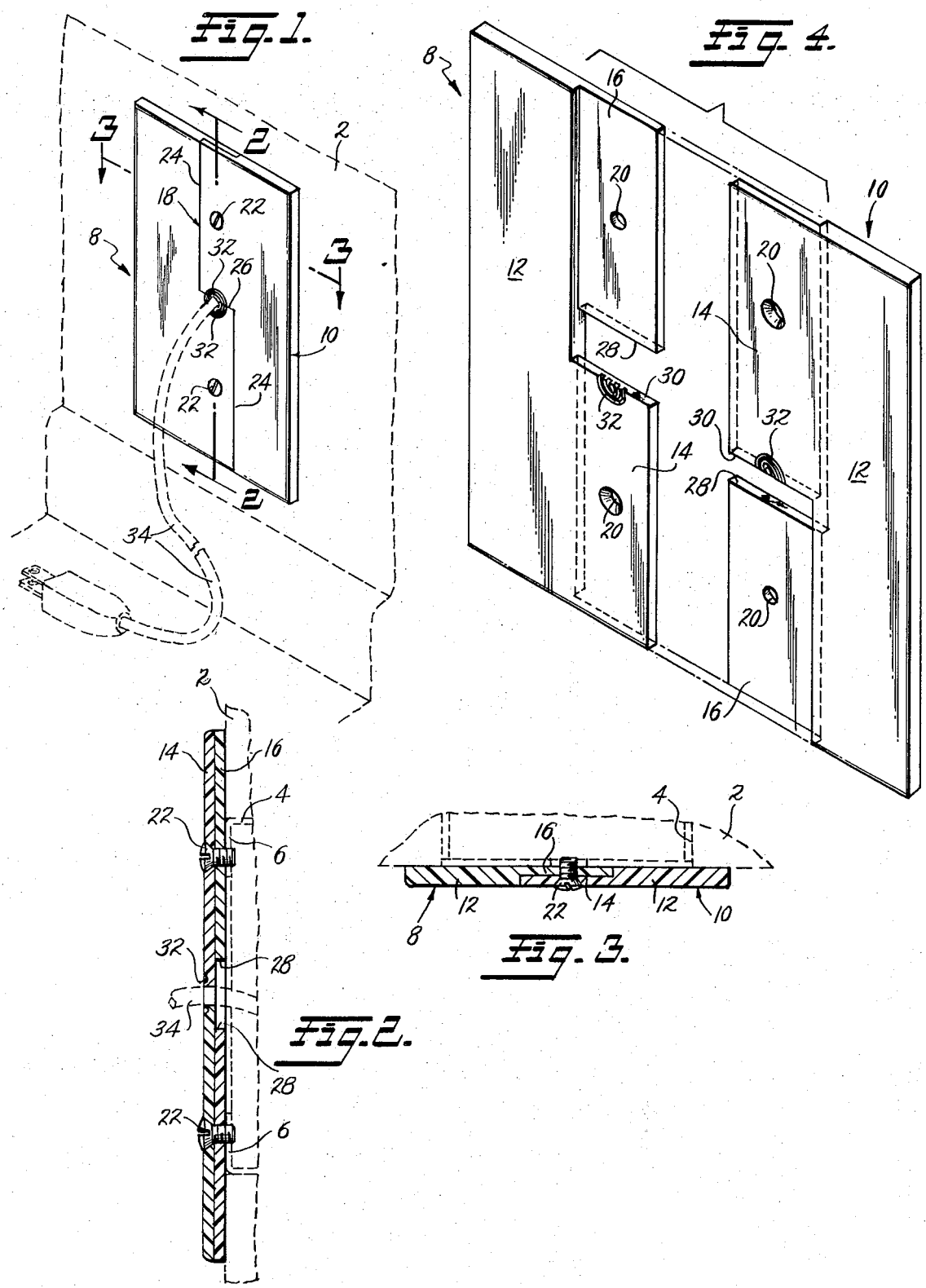

3,864,512

COVER FOR UTILITY OUTLET

BACKGROUND OF THE INVENTION

This invention is in the field of cover plates for utility outlet boxes, particularly electrical outlets.

It is customary to install outlet boxes, for telephone and communications and television lead-in cables and the like in a wall of a room with the outlet box having an opening substantially flush with the wall surface. While the invention is of particular utility with the above outlet boxes, it is not to be limited thereto. It may be employed with outlet boxes for other than telephone or television conductors. In many instances, it is necessary to remove such a cover plate for servicing the conductors for which access to the interior of the outlet boxes is necessary. Many such conductors leading from the outlet boxes have plugs or connectors permanently affixed to their free ends and, in some instances, have such plugs or connectors also on their inner ends within the outlet box. In such instances, the cover plate is usually provided with an opening therethrough of only sufficient size to receive and pass the conductor cable, such openings being too small to permit passage of a connector plug therethrough. In installing and servicing such installations, it is necessary to apply or remove the cover plate from the conductor cable and, in prior practice, it was necessary to remove the plug from at least one end of the cable or to cut the cable.

SUMMARY OF THE INVENTION

The present invention, comprising two separable cover plate members, permits the installation or removal of a cover plate and separation thereof from the cable passing therethrough without cutting the cable or removing any plugs or connectors from the ends thereof. In general, the invention comprises two identical but reversed cover plate members having complementary aperture portions at abutting edges to define an opening for the cable and which members may be mounted to the conventional outlet box without modification and wherein the same fastening means serve to hold the cover members together and to mount the same to the outlet box. While reference is made to identical cover plate members, as the description proceeds, it will be apparent that they need not be of exactly identical shape and configuration.

BRIEF DESCRIPTION OF THE DRAWINGS

FIG. 1 is a perspective view of a cover plate embodying the present invention mounted on a utility outlet box in a wall of an enclosure;

FIG. 2 is a vertical section, on an enlarged scale, taken substantially along the line 2—2 of FIG. 1;

FIG. 3 is a transverse sectional view taken substantially along the line 3—3 of FIG. 1; and FIG. 4 is an exploded perspective view of the two members of the cover plate.

DESCRIPTION OF A PREFERRED EMBODIMENT

In the drawings, numeral 2 indicates the wall of a room or the like having a more or less conventional utility outlet box 4 therein, with its outer open side generally flush with the surface of the wall 2 and being provided with central ears 6 (see FIG. 2) having threaded openings therethrough.

Numerals 8 and 10 generally designate separate members of a cover plate constructed in accordance with the present invention. As best shown in FIG. 4, the two cover plate members 8 and 10 are of identical size and shape, one being rotated 180° to constitute a complement to the other. As shown, each plate member comprises a main body portion 12, the front face surface portion of which is extended toward the other, as at 14, and being of lesser thickness than the body portion 12. The rear face portion of each extends toward the other, as shown at 16, and these portions also are of less thickness than the body portion 12, preferably about one-half the thickness. As shown in the drawings, the rear face portions 16 lie in a plane rearwardly of the front face portions 14 and the plate members of FIG. 4 may obviously be moved toward each other into edge abutting relationship wherein front face portions 14 overlap rear face portions 16 and, at the front face of the plate, a juncture line 18 (FIG. 1) appears along the abutting edge portions of the front face members. The front face portions 14 and rear face portions 16 are provided with openings 20 which are in alignment when the parts are in the relative position shown in FIG. 1 whereby suitable fastening means, such as the screws 22, may be employed to not only secure the cover plate members together, but also to mount them on the outlet box 4. As stated, the ears 6 of the outlet box are conventionally centrally located and thus the fasteners 22 appear substantially on the center line of the assembled cover plate.

As shown in the drawings, the juncture line 18 comprises end portions 24 and an intermediate portion 26 transverse to the end portions. As is clear from FIG. 4, the inner end edges 28 of the extending rear face portions 16 are respectively spaced from the intermediate portion 26 of the juncture line so that a clear space is provided rearwardly of that intermediate portion.

The plate members 8 and 10, at the edge portions 30, which abut to define the intermediate portion 26 of the juncture line, are provided with complementary concentric semi-circular score lines 32 whereby to define "knock-out" plugs to permit forming an opening across said intermediate portion of a size suitable to receive the particular conductor cable 34 to be installed.

It is to be noted that the juncture line 18 extends from one end of the generally rectangular cover plate from a position laterally offset from the vertical center line of the cover plate to the opposite end thereof at a position laterally offset to the other side of the center line of the cover plate. While the drawings show the juncture line as having two straight and parallel end portions 24 and a transverse intermediate portion 26, it is obvious that such exact configuration is not essential. The juncture line could be of other shapes but it is preferred that it be of such shape that the openings 20 through the front and rear face portions described, be located essentially on the vertical center line of the assembled cover plate to properly cover the opening of the outlet box 4 previously referred to.

While the drawings indicate that each cover plate section 8 and 10 is of plastic material and all portions thereof are integral, it is to be understood that the invention is not limited thereto. Obviously, the cover plate sections could be of material, either die cast or machined, to the shape described or the front and rear surface portions could be separate metal or plastic plates of a substantially identical L-shape and suitably secured together.

While a single specific embodiment of the invention has been shown and described in detail, it is to be understood that the invention is not limited thereto but is to be limited only by the scope of the appended claims.

I claim:

1. A cover for a utility outlet box, said cover having a front face and a rear face, comprising:

two separable complementary side-by-side plate members arranged in edge abutment to define a generally rectangular cover, the abutting edges of at least the front face portions of said plate members defining a juncture line extending from one end of said cover, laterally offset from the center line thereof, to the opposite end, laterally offset to the other side of the center line and spaced inwardly from the side edges of said cover and thus having laterally offset end portions and an intermediate portion;

a front face portion of each plate adjacent a corresponding end portion of said juncture line being in overlapping relation to a rear face portion of the other plate, said rear face portions being spaced apart at said intermediate portion of said juncture whereby to leave the region behind said intermediate portion free of obstructions;

complementary means on said plate members, at said intermediate portion of said juncture, delineating an opening through said cover; and aligned openings through said overlapping portions of said plate members for receiving fastening means to secure said cover to an outlet box and simultaneously hold said plate members in the described relationship.

2. A cover as defined in claim 1 wherein said aligned openings lie on a line substantially midway between and parallel to the side edges of said cover.

3. A cover as defined in claim 1 wherein said complementary means at said intermediate portion comprise concentric semicircular score lines whereby a hole of selected size may be formed at said juncture.

4. A cover as defined in claim 1 wherein said laterally offset end portions of said juncture are substantially parallel to the side edges of said cover and said intermediate portion is substantially perpendicular to said end portions.

5. A cover as defined in claim 1 wherein said plate members are of identical, but respectively reversed shape.

* * * * *